Oct. 27, 1953     J. E. MULAVEY     2,657,356
INSTRUMENT FOR DETERMINING RATIO
AND POLARITY OF TRANSFORMERS
Filed July 17, 1950     2 Sheets-Sheet 1

INVENTOR.
JAMES E. MULAVEY
BY Whittemore,
Hulbert & Belknap
ATTORNEYS

Oct. 27, 1953

J. E. MULAVEY 2,657,356

INSTRUMENT FOR DETERMINING RATIO
AND POLARITY OF TRANSFORMERS

Filed July 17, 1950

*INVENTOR.*
JAMES E. MULAVEY
BY *Whittemore,*
*Hulbert & Belknap*
ATTORNEYS

Patented Oct. 27, 1953

2,657,356

UNITED STATES PATENT OFFICE 2,657,356

INSTRUMENT FOR DETERMINING RATIO AND POLARITY OF TRANSFORMERS

James E. Mulavey, Detroit, Mich., assignor to The Detroit Edison Company, Detroit, Mich., a corporation of New York Application July 17, 1950, Serial No. 174,293

9 Claims. (Cl. 324—55)

The present invention relates to an instrument for determining ratio and polarity of transformers.

Prior to the present time the commonly used method of checking transformers involved the use of two voltmeters and for best results simultaneous readings of these voltmeters required two men to make the check. According to the present invention an instrument is provided which may be conveniently and easily operated by one man and readings taken which are at once more accurate and at the same time may be taken much more rapidly than with prior conventional methods. The present apparatus in a specific case was employed in ratioing all taps of a regulating transformer, a total of 51 measurements being taken and recorded. This job was completed in 45 minutes by a single man. The same job would have taken two men approximately one day had the checking been accomplished by the standard two voltmeters method.

Described in general terms, the present invention comprises a single light weight self-contained instrument which is an important advantage since many tests have to be made on the top of transformers. The instrument when properly connected to the transformer, comprises a circuit constituting a four-arm bridge, two arms being composed of the two windings of the transformer being tested, and the other two arms consisting of a resistance potential divider. A null detector is employed to determine when the bridge arms are balanced. At balance, no current is drawn from the movable contact of the potential divider so its two arms are in phase. Likewise, no current is drawn from the transformer so its primary and secondary voltages are almost exactly in phase. Therefore, a true proportional relationship exists between the transformer winding voltages and the arms of the potential divider. It follows that the position of the movable contact will indicate the voltage ratio of the transformer.

It is an object of the present invention to provide improved and simplified apparatus for determining ratio and polarity of a transformer.

It is a further object of the present invention to provide a ratio and polarity bridge for transformer testing characterized by the employment of a null detector.

It is a further object of the present invention to provide a four-arm bridge type circuit for testing the ratio and polarity of the transformer.

It is a further object of the present invention to provide an instrument characterized by its small size, light weight, ready portability, and the ease with which it may be connected to transformer windings.

It is a further object of the present invention to provide an instrument for determining ratio and polarity of transformers, including a resistance potential divider and means for increasing the setting of the potential divider required to achieve balance so as to increase the accuracy of the instrument.

It is a further object of the present invention to provide an improved and simplified instrument for testing ratio and polarity of transformers which requires a single adjustment to obtain a direct reading of the transformer ratio and which therefore requires only a single operator.

It is a further object of the present invention to provide an instrument of the character described including a null detector meter and a protective circuit therefor including a gas discharge lamp in parallel therewith.

Other objects and features of the invention will become apparent as the description proceeds, especially when taken in conjunction with the accompanying drawings, wherein.

Figure 7:
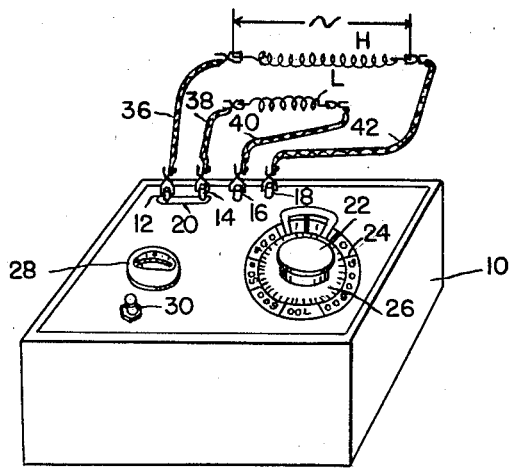
Figure 7 is a perspective view of the container in which the testing apparatus may conveniently be housed.

Before referring to the several circuits illustrated in Figures 1-5, attention is directed to Figure 7 which is a perspective view of the outside of the instrument case 10. The internal circuit of the instrument is connected as will subsequently be described, to external posts, these posts being illustrated at 12, 14, 16 and 18. The posts 12 and 14 are electrically connected by a jumper 20. The resistance potential divider is adjusted by means of a knob 22 having associated therewith dials 24 and 26. In an actual instrument constructed and tested the outer dial 24 included ten graduations of one hundred units each and the inner dial 26 included one hundred graduations. It is possible to estimate the reading of the inner dial to the nearest one-tenth of a graduation with satisfactory accuracy. Accordingly, assuming that the total resistance in the potentiometer was 10,000 ohms, readings to the nearest 1 ohm are possible.

The instrument includes a null detector 28, and a control switch 30 used to control a protective circuit for the null detector, as will subsequently be described.

Figure 1A:
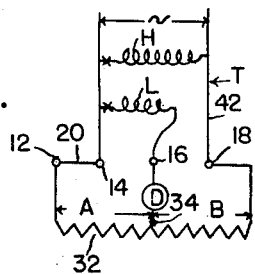
Figure 1A is a wiring diagram showing the simplest form of the present invention.
Figure 1B:
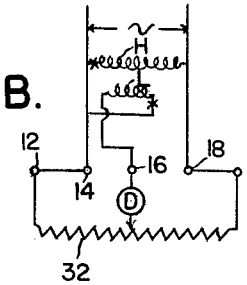
Figure 1B is a view similar to Figure 1A, showing the connections to the low voltage winding reversed to provide additive polarity.

Referring now to Figure 1A the effective circuit when the instrument is connected to the transformer is indicated. The resistance element of the resistance potential divider is indicated at 32 and the movable contact of the potential divider is indicated at 34. The value of the resistance to the left of the movable contact 34 is designated by the letter A and the value of the remaining resistance, between the movable contact and the other end of the resistance element 32, is indicated by the letter B. The resistance element 32 is connected at opposite ends to the posts 12 and 18, the post 14 being connected to the post 12 by the jumper 20. A null detector D is connected between the post 16 and the movable contact element 34 of the resistance potential divider.

Conveniently, the instrument itself may be connected to the windings of the transformer by insulated conductors having contact clips at their ends for making mechanical engagement and electrical contact with the posts of the instrument and with the ends of the transformer windings. These conductors are indicated at 36, 38, 40, 42 in Figure 7 and the resulting circuit in simplified form is illustrated in Figures 1–5.

It is convenient to show the conventional connections for a subtractive polarity transformer and this has been done in Figures 1–5 and Figure 7. However, it will be apparent to anyone skilled in the art, that a transformer having additive polarity can also be tested just as readily with the ratio and polarity bridge. This is illustrated diagrammatically in Figure 1B, which is identical with the diagram of Figure 1A, except for the connections to the low voltage windings L.

In general, the resistance element 32 of the potential divider is connected across opposite ends of the high voltage winding H. One end of the winding H is connected to one end of the low voltage winding L, this connection being illustrated in the figures as a portion of the line connecting the corresponding end of the winding H to the post 14. The remaining end of the winding L is connected to the post 16 and accordingly the null detector D is connected in series between the said one end of the winding L and the movable contact 34 of the resistance potential divider. With this arrangement, the dial of the potential divider is arranged to read the per unit resistance between the end of the resistance element connected to the post 12 and the movable contact 34. When the movable contact 34 is adjusted to give a null reading on the null detector D, the ratio of the low voltage winding L, to the high voltage winding H, is given by the relation $$\frac{L}{H} = \frac{A}{A+B}$$

where $$\frac{L}{H}$$

is the ratio of the low voltage winding to the high voltage winding, A is the per unit resistance between the end of the resistance element 32 connected to the post 12 and the movable contact, and B is the per unit resistance between the end of the resistance element 32 connected to the post 18 and the movable contact.

However, since $A+B$ may be taken as unity the ratio of the windings is equal to the value A. Thus when the bridge is balanced to a null detector reading the ratio $$\frac{L}{H}$$

is read directly from the dial of the resistance potential divider.

To obtain a null detector reading the transformer must be connected with the polarity markings as indicated in the several figures. The polarity markings in the figures are indicated by asterisks applied to the appropriate primary and secondary leads. Polarity markings of a transformer are defined in the literature as a designation of the relative instantaneous directions of current in the leads. Primary and secondary leads are said to have the same polarity when at a given instant the current enters the primary lead in question and leaves the secondary lead in question in the same direction as though the two leads formed a continuous circuit. Furthermore, the polarity of a transformer is subtractive when the polarity markings are adjacent as in Figure 1A of the drawings, and the transformer polarity is additive when the polarity markings are located diagonally as in Figure 1B. Hence, when the ratio is measured, the polarity is thus simultaneously determined. This applies to the corresponding windings in polyphase transformers as well as to single phase units. From the ratio and polarity thus obtained, the voltage diagram of the transformer can be readily constructed.

In testing the transformer a convenient voltage such for example as 120 or 240 volts, is applied across the high voltage winding as indicated in the figures. If desired, the effective source of the alternating test voltage applied to the high voltage winding may be included in the instrument case 10, although for simplicity it is preferred to employ an outside source of test potential.

Figure 2:
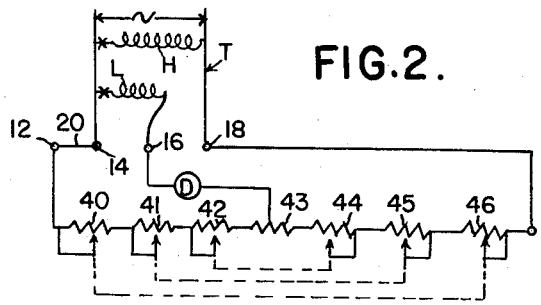
Figure 2 is a wiring diagram showing a modified form of the present invention.

Referring now to Figure 2 there is illustrated a similar circuit, corresponding parts of which have been given the same reference numerals and will not further be explained. In this case the resistance potential divider is arranged to employ seven decade units designated as 40, 41, 42, 43, 44, 45, and 46. Conveniently, the intermediate unit 43 is a 9,000 ohm unit, the first pair of mechanically connected units 42 and 44 are 900 ohm units, the second pair of mechanically connected units 41 and 45 are 90 ohm units, and the outside pair of mechanically connected units 40 and 46 are 10 ohm units. The several connected pairs of decade units are so arranged that as the resistance of one unit of a pair is increased, the other unit of the pair is correspondingly decreased, thus maintaining the total resistance consistent at the selected value, as for example 10,000 ohms.

Accordingly, at any setting of the decade the total resistance across the winding H is 10,000 ohms but it will be appreciated that this amounts merely to a different type of means for adjusting and reading the division of the total resistance across the winding LL. Otherwise, the circuit is the same as illustrated in Figure 1.

Figure 3:
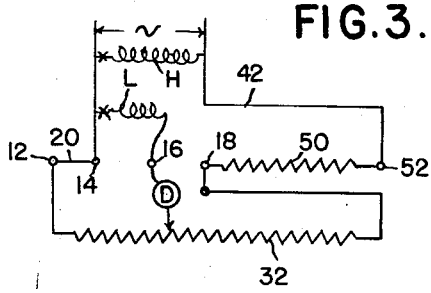
Figure 3 is a wiring diagram illustrating yet another embodiment of the present invention.

Referring now to Figure 3, a modified circuit is illustrated which is designed to increase the precision of the measurement of low ratios on the order of .025 (40 to 1) or .010 (100 to 1). In this case the circuit is identical with that illustrated in Figure 1A except for the insertion of an additional resistance 50 in series between the right hand end of the resistance element 32 and the high voltage winding H. Conveniently, this resistance element 50 may be included in the instrument and an additional post 52 provided. In order to obtain the magnified reading the electrical connector 42 is disconnected from the post 18 and connected to the post 52, thus placing the resistance element 50 in series with the resistance element 32 of the potential divider. Assuming that the total resistance of the potential divider is 10,000 ohms and the resistance element is also 10,000 ohms, the total resistance is of course increased to 20,000 ohms, and for any given transformer ratio, balance of the null detector will be obtained at two times the normal value of the resistance A. Accordingly, the accuracy of the reading of the dial is increased twofold. In an actual test it was further desirable to employ 240 volts test voltage to maintain the same meter sensitivity as obtained with 120 volts as applied to the circuit illustrated in Figure 1A.

In testing the circuit of Figure 3 a reading accurate to 0.2 percent was obtained comparable with a reading accurate to 0.4 percent obtained with the circuit illustrated in Figure 1A, on a 40/1 network transformer. However, it is noted that an accuracy of 0.4 percent is quite satisfactory for a 40/1 network transformer as this accuracy is sufficient to pick out the 2½ percent taps with which network transformers are equipped.

Figure 4:
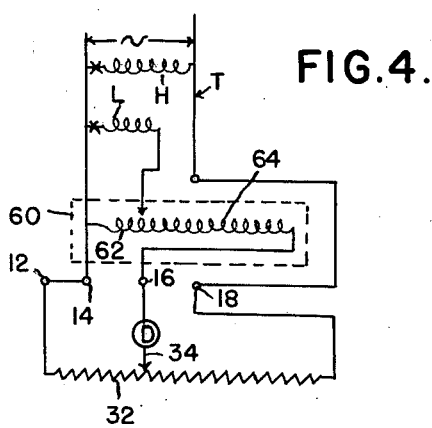
Figure 4 is a wiring diagram illustrating still another embodiment of the present invention.

Referring now to Figure 4 there is illustrated another variation in the circuit which expands the lower end of the dial to obtain increased accuracy and precision when measuring transformers with very low ratio. This circuit includes the major elements included in the circuit illustrated in Figure 1A and identical reference numerals are applied thereto. However, there is included in the circuit a 1/10 ratio autotransformer 60 having windings 62 and 64. The null detector D is connected to the outer end of the winding 64 as illustrated, and the outer end of the winding 62 is connected into the line connecting the interconnecting ends of the transformer windings to the post 14. The transformer 60 must have a high exciting impedance, low losses, and a flat no-load ratio. To demonstrate its value, assume that a transformer T having a ratio of 0.01 is to be tested. If connected directly as shown in Figure 1A the bridge would balance at 0.010 on the dial of the instrument. If a small auxiliary transformer is used, as indicated in Figure 4, balance is obtained at 0.100. If a balancing and reading accuracy of 0.2 scale divisions is assumed, the accuracy is increased from plus or minus 2 percent in the case of the circuit illustrated in Figure 1A, to an accuracy of plus or minus 0.2 percent in the circuit illustrated in Figure 4.

Figure 5:
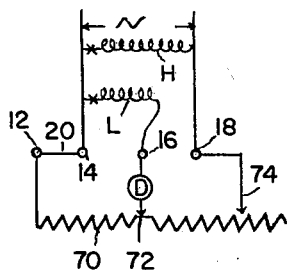
Figure 5 is a wiring diagram showing still another embodiment of the present invention.

The circuit illustrated in Figure 5 has also been tested and is in general, satisfactory. It has the advantage that the ratios are measured as $$\frac{H}{L}$$

or the ratio of the high voltage winding to the low voltage winding, which results in obtaining a ratio greater than 1. In this case the potential divider includes a resistance 70 and the null detector D is fixed to an intermediate point of the resistance 70 as indicated at 72. The end of the high voltage winding H which is interconnected to an end of the low voltage winding L, is connected to one end of the resistance element 70 through the post 12. However, the other end of the winding H is connected to the resistance element 70 by means of a movable contact 74.

Figure 6:
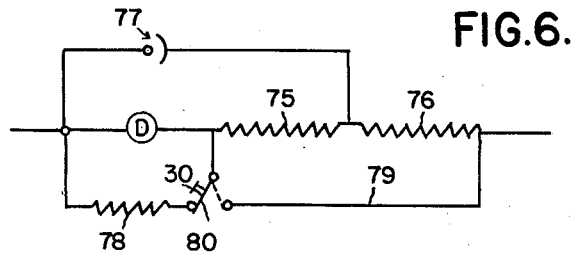
Figure 6 is a wiring diagram illustrating a protective circuit for the null detector employed in the present construction.

Referring now to Figure 6 there is illustrated a protective circuit for the null detector D. This circuit includes a first resistance 75 and a ballast resistance 76 in series with the null detector D. A gas discharge lamp 77 is connected around the null detector D and the resistance 75, the ballast resistance 76 serving as ballast for the lamp. A meter shunt resistance 7 is provided for connection around the meter and a short circuiting connection 79 is provided controlled by a switch 80 operated by the switch control element 30 element 30 previously described. The contact 80 is movable from the full line position shown, at which time resistances 75 and 76 are in series with the null detector and the ballast resistance 76 is in series with the gas discharge lamp, and the meter shunt resistance is in parallel with the null detector, to the dotted line position, at which time the null detector is connected directly.

The sensitivity switch 80 is normally in the full line position shown. The gas discharge lamp 77 conducts before the meter reaches full scale. With 250 volts applied to the bridge the meter will not show greater than full scale deflection regardless of the position of the sliding contact or the ratio of the test transformer. After adjusting the potential divider to obtain a zero reading, the sensitivity switch 80 is shifted to the dotted line position shown in Figure 6 by depressing the switch actuator 30 on the instrument case and this connects the null detector directly into the test circuit and this short circuits the resistance. The final setting of the dials is then obtained with the sensitivity switch depressed.

To obtain precise results with a bridge of the type shown in the several figures, a high degree of sensitivity in the null detector is essential. Such sensitivity is combined with a ruggedness which makes the detector in this bridge practically self protecting. The meter which is used has a non-linear current scale compressed at the higher values. Inasmuch as the meter or null detector is a direct current instrument, it includes a rectifier.

One of the important advantages of employing a bridge using a null detector is that it is less sensitive to fluctuations in test potential as compared with the prior two-voltmeter method.

In the particular meter selected, one milliampere is required to produce full scale deflection and a current as small is 1 micro-ampere can be detected.

The drawings and the foregoing specification constitute a description of the improved instrument for determining ratio and polarity of transformers in such full, clear, concise and exact terms as to enable any person skilled in the art to practice the invention, the scope of which is indicated by the appended claims.

What I claim as my invention is:

1. A ratio and polarity bridge for directly determining ratio and polarity without reference to phase angle of a transformer having a high voltage winding and a low voltage winding, comprising a resistance device, means adapted to electrically connect opposite ends of said resistance device directly to opposite ends of said high voltage winding, a null detector, means electrically connecting one side of said null detector directly to an intermediate point on said resistance device, means adapted to connect the other side of said null detector directly to one end of said low voltage winding, means adapted to electrically connect the other end of said low voltage winding directly to one end of said high voltage winding, and means for varying the ratio of the resistances at opposite sides of the means connecting said null detector to the intermediate point of said resistance device.

2. A bridge as defined in claim 1 in which said resistance device comprises a potentiometer, and the means for varying the ratio of the resistances comprises a slidable contact.

3. A bridge as defined in claim 2 comprising a fixed resistance in series between one end of said potentiometer and the end of said high voltage winding remote from the connection between the ends of said windings.

4. A bridge as defined in claim 1 in which an auto-transformer is electrically connected between the low voltage winding and said null detector to amplify the reading of the null detector if unbalance exists.

5. A bridge as defined in claim 1 in which said resistance device comprises a potentiometer having a slidable intermediate contact and said null detector is electrically connected in series between the end of said low voltage winding remote from the connection between said winding and said slidable contact.

6. A bridge as defined in claim 1 in which the electrical connection between the null detector and resistance device is fixed with respect to the resistance device, and the means for varying the ratio of the resistances at opposite sides of the connection to the null detector comprises adjustable means for varying the value of the resistance between the null detector connection and the side of the high voltage winding remote from the electrical connection between the windings.

7. A ratio and polarity bridge for directly determining ratio and polarity without reference to phase angle of a transformer having a high voltage winding and a low voltage winding, comprising a resistance device, means adapted to electrically connect opposite ends of said resistance device directly to opposite ends of said high voltage winding, a null detector, means electrically connecting one side of said null detector directly to an intermediate point on said resistance device, means adapted to connect the other side of said null detector directly to one end of said low voltage winding, means adapted to electrically connect the other end of said low voltage winding directly to one end of said high voltage winding, and means for inversely varying the values of the resistances at opposite sides of the means connecting said null detector to the intermediate point of said resistance device.

8. A ratio and polarity bridge for directly determining ratio and polarity without reference to phase angle of a transformer having a high voltage winding and a low voltage winding, comprising a resistance device, means adapted to electrically connect opposite ends of said resistance device directly to opposite ends of said high voltage winding, a null detector, means electrically connecting one side of said null detector directly to an intermediate point on said resistance device, means adapted to connect the other side of said null detector directly to one end of said low voltage winding, means adapted to electrically connect the other end of said low voltage winding directly to one end of said high voltage winding, means for varying the ratio of the resistances at opposite sides of the means connecting said null detector to the intermediate point of said resistance device, and protective means for said null detector comprising a gas discharge lamp in parallel with said detector, a ballast resistance in series with said lamp and detector, a detector shunt resistance in parallel with said detector and a switch operable to short circuit both of said resistances to apply full voltage to said detector.

9. A ratio and polarity bridge for directly determining ratio and polarity of a transformer having a high voltage winding and a low voltage winding, comprising a fixed resistance adapted to be connected directly across the ends of the high voltage winding, means adapted to electrically connect one end of the high voltage winding directly to one end of the low voltage winding, a null detector adapted to be electrically connected at one side directly to the other end of said low voltage winding and connected at the other side directly to an intermediate point of said fixed resistance, and means for varying the ratio between the values of said resistance at opposite sides of said intermediate point to obtain a zero reading on said detector.

JAMES E. MULAVEY.

References Cited in the file of this patent

UNITED STATES PATENTS

| Number | Name | Date |
| --- | --- | --- |
| 1,483,438 | Hedin | Feb. 12, 1924 |
| 1,588,539 | Fortescue | June 15, 1926 |
| 2,410,386 | Miller | Oct. 29, 1946 |
| 2,481,198 | Caldwell | Sept. 6, 1949 |
| 2,509,027 | Zimmermann | May 23, 1950 |